United States Patent
Miller, Jr.

(10) Patent No.: US 10,940,837 B2
(45) Date of Patent: Mar. 9, 2021

(54) STEERING FAILURE BRAKE SYSTEM REACTION

(71) Applicant: Bendix Commercial Vehicle Systems LLC, Elyria, OH (US)

(72) Inventor: Thomas S. Miller, Jr., Lagrange, OH (US)

(73) Assignee: BENDIX COMMERCIAL VEHICLE SYSTEMS LLC, Elyria, OH (US)

(*) Notice: Subject to any disclaimer, the term of this patent is extended or adjusted under 35 U.S.C. 154(b) by 147 days.

(21) Appl. No.: 15/911,452

(22) Filed: Mar. 5, 2018

(65) Prior Publication Data

US 2019/0270437 A1 Sep. 5, 2019

(51) Int. Cl.
| | |
|---|---|
| *B60T 8/1755* | (2006.01) |
| *B60T 8/1764* | (2006.01) |
| *B60T 8/24* | (2006.01) |
| *G05D 1/08* | (2006.01) |
| *B60T 8/88* | (2006.01) |
| *B60T 8/96* | (2006.01) |
| *B62D 6/00* | (2006.01) |

(52) U.S. Cl.
CPC ........ *B60T 8/17551* (2013.01); *B60T 8/1764* (2013.01); *B60T 8/241* (2013.01); *B60T 8/246* (2013.01); *B60T 8/885* (2013.01); *B60T 8/96* (2013.01); *B62D 6/003* (2013.01); *G05D 1/0891* (2013.01); *B60T 2260/024* (2013.01); *B60T 2270/402* (2013.01)

(58) Field of Classification Search
CPC ........ B60T 8/17551; B60T 8/246; B60T 8/96; B60T 2260/024; B60T 8/1764; B62D 6/003
See application file for complete search history.

(56) References Cited

U.S. PATENT DOCUMENTS

| | | | |
|---|---|---|---|
| 5,206,808 A | 4/1993 | Inoue et al. | |
| 5,362,080 A * | 11/1994 | Bishop | B62D 6/00 |
| | | | 180/415 |
| 6,279,674 B1 | 8/2001 | Lissel et al. | |

(Continued)

FOREIGN PATENT DOCUMENTS

| | | |
|---|---|---|
| DE | 10 2004 023 497 B4 | 3/2014 |
| DE | 102 36 331 A1 | 1/2015 |

(Continued)

OTHER PUBLICATIONS

Zhang et al. "Vehicle dynamics control based on sliding mode control technology" Control and Decision Conference, 2009. CCDC '09, Jun. 17-19, 2009, 5 pages.

*Primary Examiner* — Anne Marie Antonucci
*Assistant Examiner* — Abdalla A Khaled
(74) *Attorney, Agent, or Firm* — Fay Sharpe LLP

(57) ABSTRACT

When a vehicle experiences an instability event, an instability event trigger (e.g., a failed modulator, unexpected yaw or lateral acceleration, unexpected steering wheel position change, etc.) is monitored and the magnitude thereof is compared to a corresponding predetermined threshold above which corrective action is initiated. Depending on the magnitude and type of instability trigger, one or more wheel ends are identified as candidates for brake activation. Braking force at the identified wheel ends is gradually increased until the vehicle becomes stable or comes to a stop.

30 Claims, 4 Drawing Sheets

(56) References Cited

U.S. PATENT DOCUMENTS

| | | |
|---|---|---|
| 6,416,140 B1 | 7/2002 | Yamamoto et al. |
| 6,808,041 B2 | 10/2004 | Demerly |
| 6,923,510 B2 | 8/2005 | Hac |
| 7,295,906 B2 | 11/2007 | Asano |
| 7,644,998 B2 | 1/2010 | Nishino et al. |
| 2003/0221894 A1 | 12/2003 | Guldner et al. |
| 2004/0140147 A1 | 7/2004 | Laurent |
| 2005/0168064 A1 | 8/2005 | McCann |
| 2006/0158031 A1* | 7/2006 | Kummel .............. B60T 8/17554 303/146 |
| 2007/0052291 A1* | 3/2007 | Eberling ................ B60T 7/122 303/191 |
| 2007/0164603 A1 | 7/2007 | Oehme |
| 2009/0145684 A1 | 6/2009 | Sherwin |
| 2010/0114431 A1* | 5/2010 | Switkes .............. B60T 8/17557 701/41 |
| 2010/0198475 A1* | 8/2010 | Stolzl ........................ B60L 7/18 701/74 |
| 2010/0332098 A1* | 12/2010 | Kato .................. B60T 8/17554 701/72 |
| 2011/0297460 A1* | 12/2011 | Chess .................... B62D 11/08 180/6.66 |
| 2013/0030651 A1 | 1/2013 | Moshchuk et al. |
| 2016/0090100 A1 | 3/2016 | Oyama et al. |
| 2016/0121870 A1* | 5/2016 | Bennett ................ B60T 17/221 701/71 |

FOREIGN PATENT DOCUMENTS

| | | |
|---|---|---|
| GB | 2 310 177 A | 8/1997 |
| JP | 2000-344077 A | 12/2000 |
| JP | 2003-63373 A | 3/2003 |
| WO | 2017/058707 A1 | 4/2017 |
| WO | WO-2017058707 A1 * | 4/2017 ............ B60T 8/1755 |

* cited by examiner

STEERING FAILURE BRAKE SYSTEM REACTION

BACKGROUND

The present application finds particular application in commercial vehicle brake systems. However, it will be appreciated that the described techniques may also find application in other vehicle safety systems, or other vehicle braking systems.

Conventional systems and methods for stabilizing vehicles respond by braking all wheels to achieve a certain overall braking force in response to one or more wheel brakes failing. The brake forces are equalized in order to maintain stability. However, such systems and methods only deal with a failed brake and compensate therefor by applying additional pressure at the brakes that have not failed.

The present innovation provides new and improved systems and methods that facilitate monitoring for vehicle steering failure and counteracting with up-to-full braking which may include intentionally locking one or more wheel ends, which overcome the above-referenced problems and others.

SUMMARY

In accordance with one aspect, a system that facilitates maintaining lateral control of a vehicle comprises a sensor that monitors at least one parameter of the vehicle, a plurality of wheel ends each comprising a brake component, and a processor with control logic, the control logic being configured to receive from the sensor information related to a current parameter value. The processor is further configured to compare the current parameter value to a predetermined parameter threshold value, determine that the current parameter value exceeds the predetermined parameter threshold value and that at least one wheel end is affected, and transmit a control signal that causes one or more brake components that are not associated with the affected wheel end to begin to increase braking force at one or more respective unaffected wheel ends to maintain stability.

In accordance with another aspect, a method for maintaining lateral control of a vehicle comprises monitoring at least one parameter of the vehicle having a plurality of wheel ends each comprising a brake component, receiving information related to a current parameter value for a monitored vehicle parameter, and comparing the current parameter value to a predetermined parameter threshold value. The method further comprises determining that the current parameter value exceeds the predetermined parameter threshold value and that at least one wheel end is affected, and transmitting a control signal that causes one or more brake components not associated with the affected wheel end to begin increasing braking force at one or more respective unaffected wheel ends in order to maintain stability.

In accordance with another aspect, a processor that facilitates maintaining lateral control of a vehicle is configured to monitor at least one parameter of the vehicle having a plurality of wheel ends each comprising a brake component, receive information related to a current parameter value for a monitored vehicle parameter, and compare the current parameter value to a predetermined parameter threshold value. The processor is further configured to determine that the current parameter value exceeds the predetermined parameter threshold value such that at least one wheel end is affected, and transmit a control signal that causes one or more brake components not associated with the at least one affected wheel end to begin increasing braking force at one or more respective unaffected wheel ends to maintain stability.

In accordance with another aspect, an apparatus for maintaining lateral control of a vehicle comprises monitoring means for monitoring at least one parameter of the vehicle having a plurality of wheel ends each comprising a brake component, receiving means for receiving information related to a current parameter value for a monitored vehicle parameter, and comparing means for comparing the current parameter value to a predetermined parameter threshold value. The apparatus further comprises determining means for determining that the current parameter value exceeds the predetermined parameter threshold value such that at least one wheel end is affected, and transmitting means for transmitting a control signal that causes one or more brake components not associated with the at least one affected wheel end to begin increasing braking force at one or more unaffected wheel ends to maintain stability.

One advantage is that vehicle stability is improved.

Another advantage is that vehicle safety is improved.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate identifying an instability event in a vehicle and initiating a brake response to stabilize the vehicle in response thereto. The described systems and methods apply to several conditions or events in which the lateral control of the vehicle (e.g., steering, differential braking) may fail in an undesirable manner. For example, if a modulator at a given wheel end were to fail during an autonomous braking event, the vehicle will pull strongly to one side. Similarly, a failure of the autonomous steering system in which the steering rotates incorrectly in one direction will cause the vehicle to pull strongly to one side.

Accordingly, when a vehicle instability event is detected, the described systems and methods facilitate initiating application of one or more brake components up to full braking. In one embodiment, all brakes are applied up to full braking. In another embodiment, the brakes on only one wheel axle are applied. The wheel(s) that are incorrectly pulling the vehicle in one direction have some amount of their tractive effort dedicated to the road. By applying the brakes strongly, the other wheel ends not pulling the vehicle to one side act to reduce the vehicle speed, which increases stability. Additionally, the braking on these activated wheel ends counteract the yaw moment developed by incorrectly acting wheel(s). The incorrectly acting wheel(s) now need to compensate for the additional braking and (if not already saturated) will lose their detrimental lateral effect if they begin to slip under braking. The described systems and methods can additionally be employed to intentionally lock the steer axle wheels with braking during an incorrectly-acting steering system failure, saturating the steering axle wheels and thereby reducing the lateral grip and stabilizing the vehicle.

Figure 1:
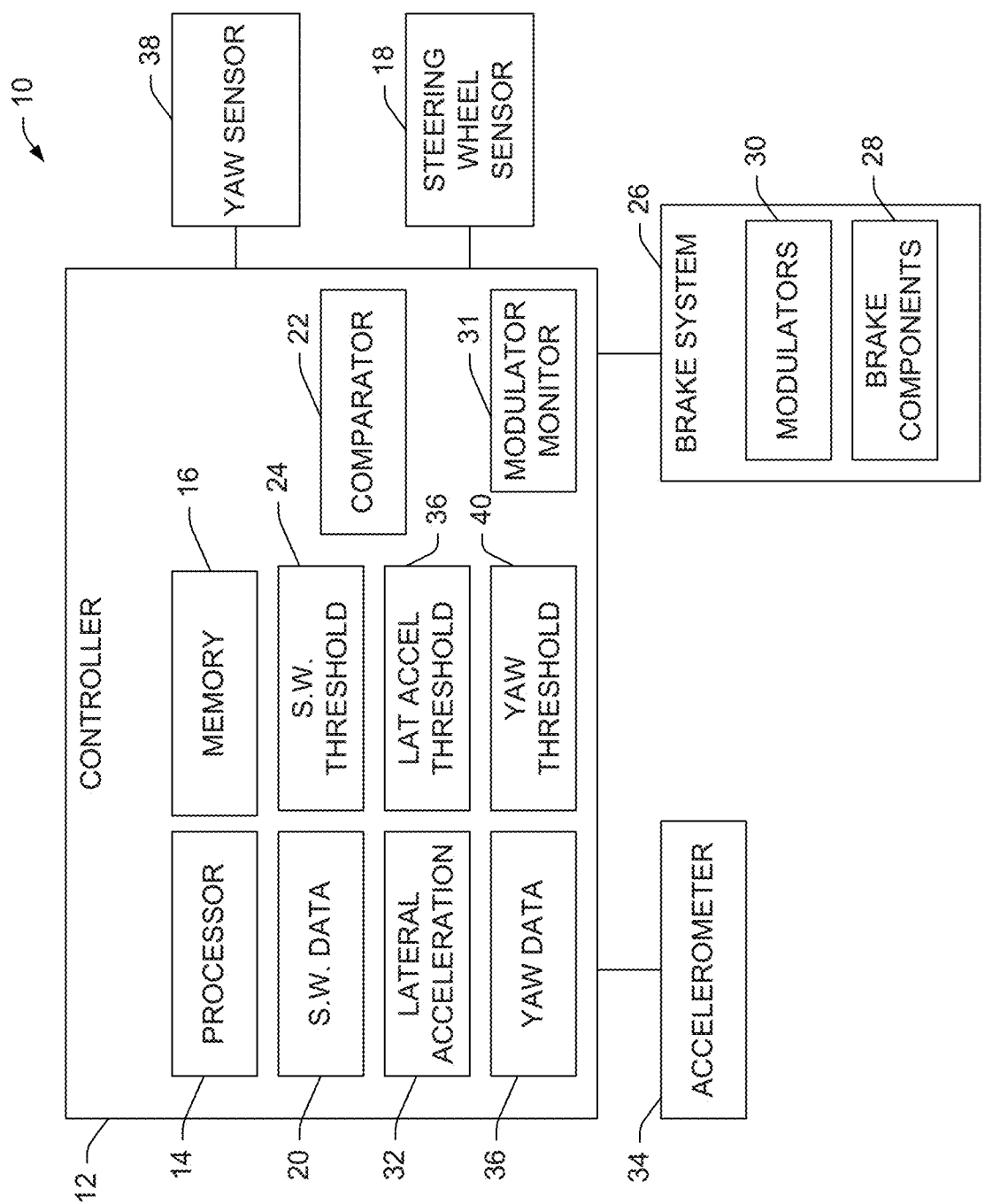
FIG. 1 illustrates a system that facilitates activating one or more brake components to stabilize a vehicle by reducing lateral grip at an incorrectly-acting (e.g., locked) wheel end, in accordance with one or more features described herein.

FIG. 1 illustrates a system 10 that facilitates activating one or more brake components to stabilize a vehicle by reducing lateral grip at an incorrectly-acting (e.g., locked) wheel end, in accordance with one or more features described herein. The system includes a brake controller 12, which comprises processor 14 that executes, and a memory 16 that stores, computer-executable instructions (e.g., modules, routines, programs, applications, etc.) for performing the various methods, techniques protocols, etc., described herein. The memory 16 may include volatile memory, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

The system further includes a steering wheel sensor 18 that monitors movement of a steering wheel in the vehicle. In one embodiment, the steering wheel event is a turning of the steering wheel by an amount greater than a predetermined threshold given the speed of the vehicle. Steering wheel movement and/or position data 20 is stored in the controller memory 16 and compared by a comparator 22 to a steering wheel position and/or movement threshold value 24. In one embodiment, the steering wheel threshold value varies with the speed of the vehicle. For instance, if the steering wheel turns more than, e.g., 90° (or is detected to be at a 90° angle), while the vehicle is traveling at greater than, e.g., 11 mph, then the controller sends a command to the brake system 26 to increase braking force at one or more wheel ends, in order to stabilize the vehicle.

To further this example, if the steering wheel turns to the left (driver's side) by an amount greater than the steering wheel movement threshold at a given speed, then the vehicle with careen to the left. In order to counteract the leftward movement, the controller sends a command to the brake system 26 to initiate braking at brake components 28 (e.g., drum brakes, disc brakes, or any other suitable type of brake) of one or more wheel ends. For instance, the passenger side (right) wheel end brake can be activated to counteract the leftward movement of the vehicle. In another embodiment, both wheel ends on the steering axle are activated. In yet another embodiment, all wheel end brakes on the vehicle are activated. Activation of the brakes can be partial or complete activation. When less than complete brake force is applied, vehicle parameters such as yaw, lateral acceleration, and/or steering wheel position can be monitored as brake force is increased up to 100% at the activated wheel ends, until the vehicle is stabilized. Alternatively, one or more brake components can be placed into a locked state to stabilize the vehicle until it is stopped.

Each brake component 28 at each wheel end is coupled to a modulator 30 that regulates air flow to its respective brake component 28. In one modulator failure mode, the modulator opens and unrestricted brake force is supplied to its brake component, causing that brake component to lock. When this happens, the vehicle is pulled toward side of the vehicle with the locked brake. For instance, if front (steering) driver's side wheel end modulator fails, the vehicle will veer left. In order to stabilize the vehicle during such an instability event, the controller comprises a modulator monitor module 31 that is configured to receive or detect a modulator failure alert indicating that a modulator has failed. In response to a failed modulator alert, the controller the controller sends a command to the brake system 26 to initiate braking at brake components 28 of one or more wheel ends. For instance, the passenger side (right) wheel end brake can be activated to counteract the leftward movement of the vehicle. In another embodiment, both wheel ends on the steering axle are activated. In yet another embodiment, all wheel end brakes on the vehicle are activated. Activation of the brakes can be partial or complete activation. When less than complete brake force is applied, vehicle parameters such as yaw, lateral acceleration, and/or steering wheel position can be monitored as brake force is increased up to full brake force, until the vehicle is stabilized. Alternatively, one or more brake components can be placed into a locked state to stabilize the vehicle until it is stopped.

According to another embodiment, a failed modulator condition is detected by the steering wheel sensor, i.e., when the steering wheel suddenly turns toward the side of the vehicle on which the failed modulator is located due to a locked brake component at that modulator. In this case the controller sends a command to fully or partially apply one or more brake components as described above until the vehicle is stabilized and/or stopped.

In another embodiment, the comparator module 22 is configured to compare a stability input value such as e.g., lateral acceleration information 32 from a vehicle accelerometer 34 to a predetermined lateral acceleration threshold value 36. In one example the lateral acceleration threshold value is set to 0.3G. However, this threshold value can be set to any predefined value (e.g., 0.15G, 0.2G, 0.24G, etc.) If the lateral acceleration threshold value 36 is exceeded, then the controller 12 sends a command to the brake system 26 to lock one or more wheel ends in order to stabilize the vehicle. For instance, if the lateral acceleration is to the right (passenger side) of the vehicle, then the driver side (left) wheel end brake on the steering axle can be activated to counteract the leftward movement of the vehicle. In another embodiment, both wheel ends on the steering axle are activated. In yet another embodiment, all wheel end brakes on the vehicle are activated. Activation of the brakes can be partial or complete activation. When less than complete brake force is applied, vehicle parameters such as yaw, lateral acceleration, and/or steering wheel position can be monitored as brake force is increased up to full brake force, until the vehicle is stabilized. Alternatively, one or more brake components can be placed directly into a locked state to stabilize the vehicle until it is stopped.

In another embodiment, the comparator module 22 is configured to compare a stability input such as, e.g., yaw information 36 from a yaw rate sensor 38 to a predetermined yaw threshold value 40. Yaw is calculated against the existing travel direction of the vehicle. The system can also detect yaw error between the desired direction of travel from the steering wheel sensor 18 and the actual yaw of the vehicle from yaw rate sensor 38. If the yaw error calculated is greater than the yaw threshold value then the controller 12 generates and transmits a brake initiation signal to the brake system 26 to counteract the undesired yaw and stabilize the vehicle.

For instance, if the vehicle is yawing to the right (passenger side), then the driver side (left) wheel end brake(s) can be activated to counteract the leftward movement of the vehicle. In another embodiment, both wheel end brakes on the steering axle are activated. In yet another embodiment, all wheel end brakes on the vehicle are activated. Activation of the brakes can be partial or complete activation. When less than complete brake force is applied, vehicle parameters such as yaw, lateral acceleration, and/or steering wheel position can be monitored as brake force is increased up to full brake force, until the vehicle is stabilized. Alternatively, one or more brake components can be placed directly into a locked state to stabilize the vehicle until it is stopped.

As previously mentioned one or more brake components can be locked in response to a detected instability event (large steering wheel movement, failed modulator, large yaw or lateral acceleration, etc.). In another embodiment, the controller sends a signal to the brake system to initiate less than full braking at one or more selected brake components. In this manner, the brakes are applied at the corresponding selected wheel end(s) to stabilize the vehicle. The instability trigger (steering wheel movement, lateral acceleration, yaw, etc.) is then monitored in real time as brake for is applied. Continuously or at predetermined intervals the magnitude of the instability trigger is compared to the appropriate threshold value. If the condition is not improved, then the controller signals the brake system to further increase brake force at the selected wheel end(s). This approach is iterated until the instability is resolved (i.e., the magnitude of the instability trigger is below the threshold) or the vehicle has come to a stop.

Figure 2:
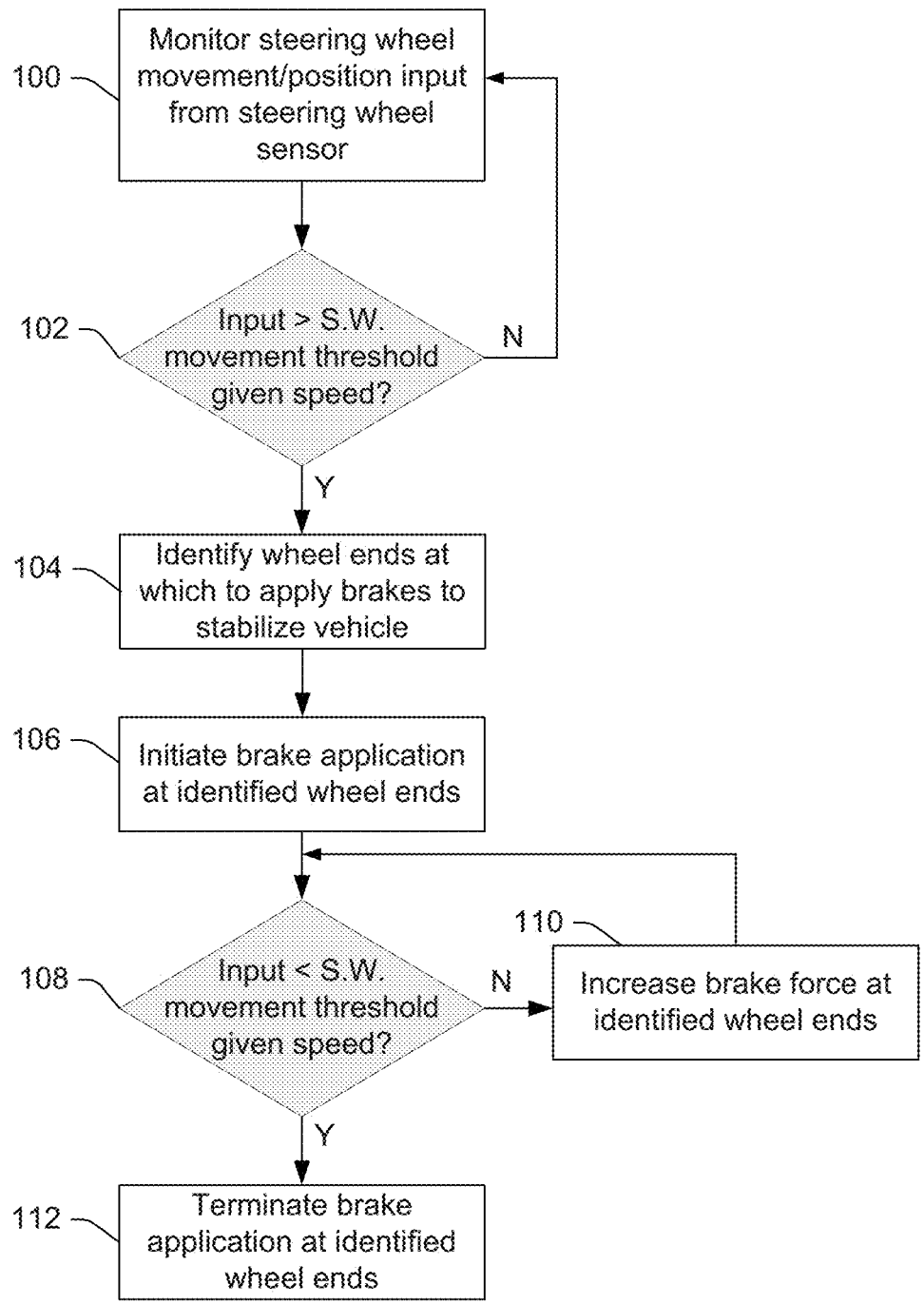
FIG. 2 illustrates a method for stabilizing a vehicle using steering wheel position information to reduce lateral grip at an incorrectly-acting (e.g., locked) wheel end by activating brakes at one or more other wheel ends, in accordance with one or more features described herein.

FIG. 2 illustrates a method for stabilizing a vehicle using steering wheel position information to reduce lateral grip at an incorrectly-acting (e.g., locked) wheel end by activating brakes at one or more other wheel ends, in accordance with one or more features described herein. At 100, steering wheel position and/or movement is monitored. At 102, the steering wheel position and/or movement information is compared to a predetermined steering wheel threshold value to identify abnormal steering wheel position or movement given the vehicle's speed and direction of travel. Abrupt or abnormal steering wheel movement may be caused by, e.g., driver error, a failed modulator, etc. In one embodiment, the steering wheel threshold value varies with the speed of the vehicle. For instance, if the steering wheel turns more than, e.g., 70° while the vehicle is traveling at greater than, e.g., 16 mph, then the controller sends a command to the brake system to increase braking force or lock one or more wheel ends, in order to stabilize the vehicle. If the steering wheel input value is not greater than the steering wheel threshold value, then the method reverts to 100 for continued monitoring of the steering when position and/or movement.

If the steering wheel input is greater than the steering wheel threshold value, then at 104, one or more brake components at one or more corresponding wheel ends are identified as being candidates for brake application to stabilize the vehicle. Brake component identification can be performed, e.g., via a table look up that correlates steering wheel position or movement to corrective braking action. At 106, brake application is initiated at the identified wheel ends. At 108, a determination is made regarding whether the steering wheel position or movement has been restored to below the steering wheel threshold. If not, then at 110, brake force at the identified wheel ends is increased and the method reverts to 108 for continued evaluation of the steering wheel. If the steering wheel position or movement value has fallen below the steering wheel threshold, then at 112, braking is terminated at the identified wheel ends.

Figure 3:
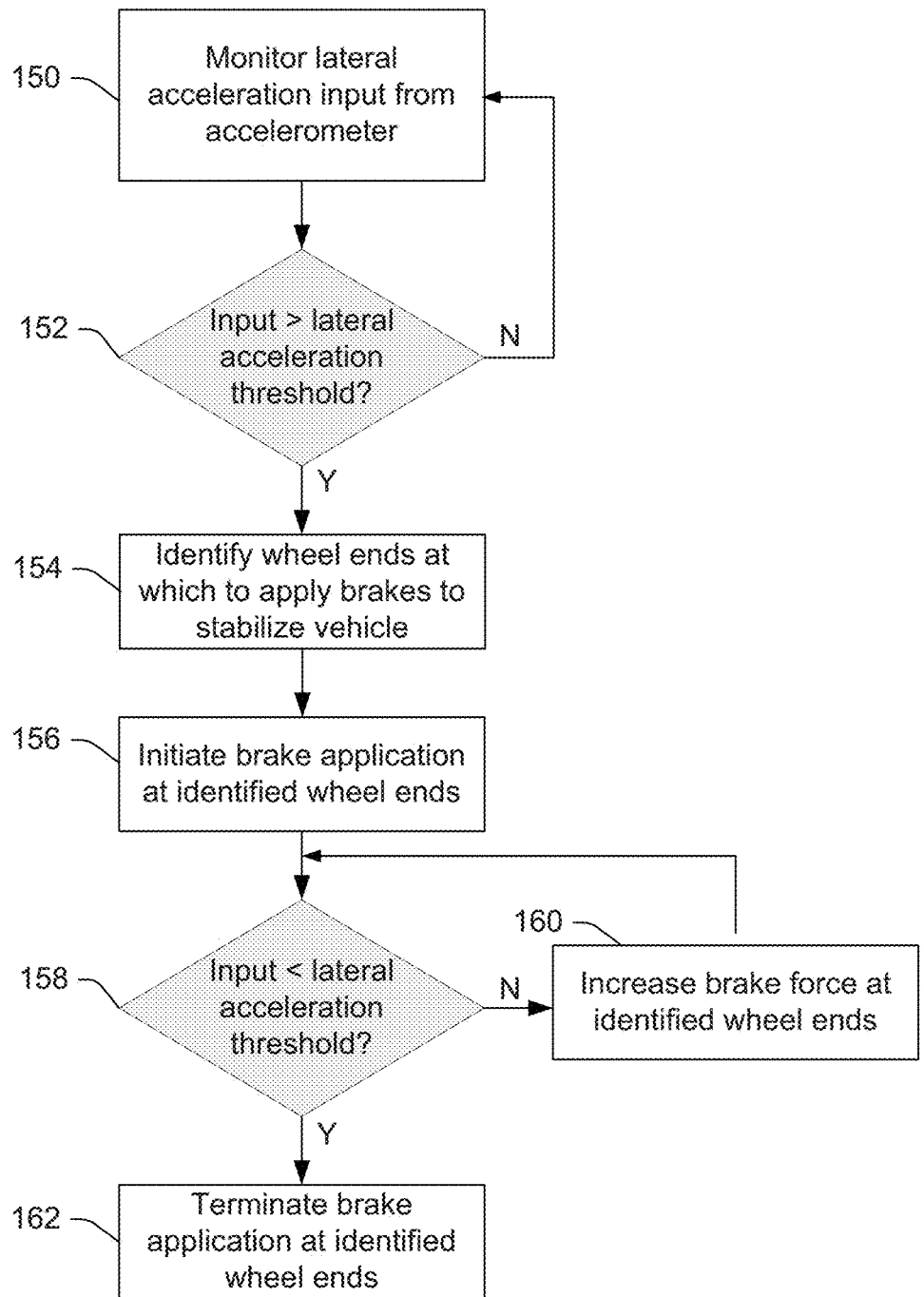
FIG. 3 illustrates a method for stabilizing a vehicle using lateral acceleration information to reduce lateral grip at an incorrectly-acting (e.g., locked) wheel end by activating brakes at one or more other wheel ends, in accordance with one or more features described herein.

FIG. 3 illustrates a method for stabilizing a vehicle using lateral acceleration information to reduce lateral grip at an incorrectly-acting (e.g., locked) wheel end by activating brakes at one or more other wheel ends, in accordance with one or more features described herein. At 150, lateral acceleration of the vehicle is monitored. At 152, a current lateral acceleration value is compared to a predetermined lateral acceleration threshold value. If the lateral acceleration input value is not greater than the lateral acceleration threshold value, then the method reverts to 150 for continued monitoring of the lateral acceleration of the vehicle.

If the current lateral acceleration input is greater than the lateral acceleration threshold value, then at 154, one or more brake components at one or more corresponding wheel ends are identified as being candidates for brake application to stabilize the vehicle. Brake component identification can be performed, e.g., via a table look up that correlates lateral acceleration to corrective braking action. At 156, brake application is initiated at the identified wheel ends. At 158, a determination is made regarding whether the lateral acceleration has been restored to below the lateral acceleration threshold. If not, then at 160, brake force at the identified wheel end(s) is increased and the method reverts to 158 for continued evaluation of the lateral acceleration. If the lateral acceleration value has fallen below the lateral acceleration threshold, then at 162, braking is terminated at the identified wheel ends.

Figure 4:
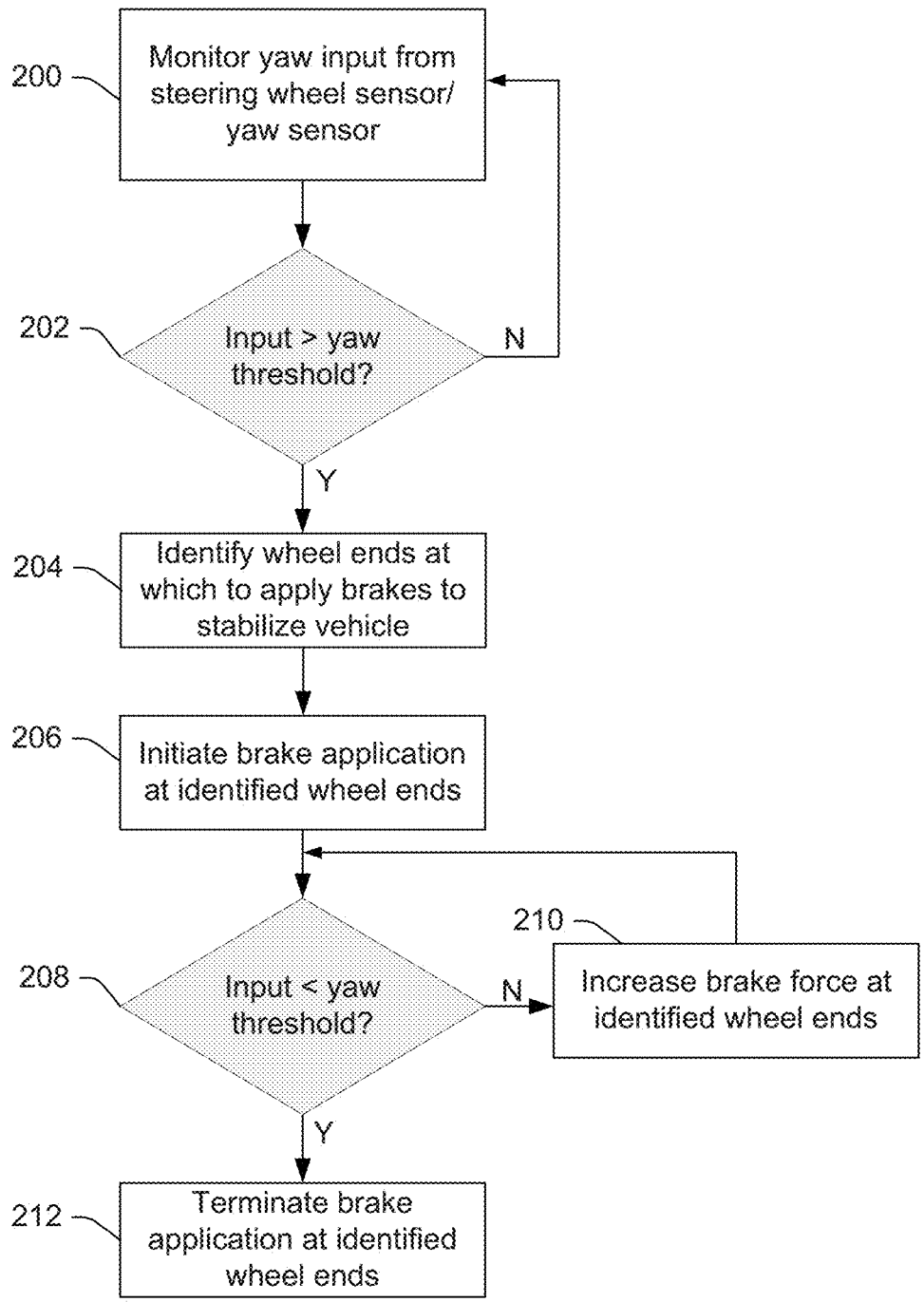
FIG. 4 illustrates a method for stabilizing a vehicle using yaw information to reduce lateral grip at an incorrectly-acting (e.g., locked) wheel end by activating brakes at one or more other wheel ends, in accordance with one or more features described herein.

FIG. 4 illustrates a method for stabilizing a vehicle using yaw information to reduce lateral grip at an incorrectly-acting (e.g., locked) wheel end by activating brakes at one or more other wheel ends, in accordance with one or more features described herein. At 200, vehicle yaw is monitored. Yaw information can be derived e.g., by a processor based on information received from a yaw sensor on the vehicle and/or from a steering wheel sensor. At 202, a current yaw value is compared to a predetermined yaw threshold value. If the yaw input value is not greater than the yaw threshold value, then the method reverts to 200 for continued monitoring of the yaw of the vehicle.

If the current yaw input is greater than the yaw threshold value, then at 204, one or more brake components at one or more corresponding wheel ends are identified as being candidates for brake application to stabilize the vehicle. Brake component identification can be performed, e.g., via a table look up that correlates yaw to corrective braking action. At 206, brake application is initiated at the identified wheel ends. At 208, a determination is made regarding whether the yaw has been restored to below the yaw threshold. If not, then at 210, brake force at the identified wheel end(s) is increased and the method reverts to 208 for continued evaluation of the yaw. If the yaw value has fallen below the yaw threshold, then at 212, braking is terminated at the identified wheel ends.

The methods of FIGS. 2-4 facilitate iteratively increasing brake force at one or more selected brake components when correcting for a locked wheel end or for abrupt lateral acceleration or vehicle yaw in order to bring the vehicle back into a safe and stable condition. It will be understood that the brake force can be incremented at predetermined intervals or increments, or continuously ramped upward at a predetermined rate until the vehicle is stabilized. Similarly, the magnitude of the instability trigger (e.g., steering wheel position or movement, lateral acceleration, yaw, etc.) can be compared to the appropriate threshold value at predefined intervals or continuously. In another embodiment, one or more wheel ends can be immediately locked by applying 100% brake force in response to a detected instability event (large steering wheel movement, failed modulator, large yaw or lateral acceleration, etc.).

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates maintaining lateral control of a vehicle, comprising:
   a sensor that monitors at least one parameter of the vehicle;
   a plurality of wheel ends each comprising a brake component; and
   a processor with control logic, the control logic being configured to:
   receive from the sensor information related to a current parameter value;
   receive from a steering wheel sensor information indicative of a failed modulator valve;
   compare the current parameter value to a predetermined parameter threshold value;
   determine that the current parameter value exceeds the predetermined parameter threshold value;
   identify at least one wheel end that is affected by the failed modulator valve; and
   transmit a control signal that causes one or more brake components that are not associated with the identified at least one wheel end that is affected to begin to increase braking force only at one or more respective unaffected wheel ends to maintain stability.

2. The system according to claim 1, wherein the control logic is further configured to:
   receive updated parameter values as the one or more brake components are increasing braking force and,
   if an updated parameter value remains above the a predetermined parameter threshold value as the one or more brake components increase braking force, place one or more brake components associated with wheel ends on a steering axle in a locked state.

3. The system according to claim 1, wherein the at least one parameter is vehicle yaw and the predetermined parameter threshold value is a predetermined yaw threshold value.

4. The system according to claim 1, wherein the predetermined parameter threshold is exceeded when a steering system fault condition exists.

5. The system according to claim 1, wherein the at least one parameter is lateral acceleration, and wherein the predetermined parameter threshold value is a predetermined lateral acceleration threshold value.

6. The system according to claim 5, wherein the predetermined lateral acceleration threshold value is approximately 0.3G.

7. The system according to claim 1, wherein the sensor is one of an accelerometer and a yaw rate sensor, and wherein the predetermined parameter threshold respectively is one of a lateral acceleration threshold an a yaw threshold.

8. The system according to claim 1, wherein the at least one parameter is a condition of a brake modulator valve, and wherein the predetermined parameter threshold is exceeded when a brake modulator valve fault condition exists.

9. The system according to claim 1, wherein the one or more brake components are on a steering axle of the vehicle.

10. The system according to claim 1, wherein the control logic is further configured to determine that the at least one affected wheel end is on a steering axle, and to brake an opposite steering axle wheel end first, followed by braking a drive axle.

11. The system according to claim 1, wherein the control logic is further configured to determine that the at least one affected wheel end is on a first side of a drive axle, and to brake one of an opposite wheel end on the drive axle or an opposite wheel end on a steering axle.

12. A method for maintaining lateral control of a vehicle, comprising:
    monitoring at least one parameter of the vehicle having a plurality of wheel ends each comprising a brake component;
    receiving information related to a current parameter value for a monitored vehicle parameter;
    receiving from a steering wheel sensor information indicative of a failed modulator valve;
    comparing the current parameter value to a predetermined parameter threshold value;
    determining that the current parameter value exceeds the predetermined parameter threshold value;
    identifying at least one wheel end that is affected by the faded modulator valve; and
    transmitting a control signal that causes one or more brake components not associated with the identified at least one wheel end that is affected to begin increasing braking force only at one or more respective unaffected wheel ends in order to maintain stability.

13. The method according to claim 12, further comprising:
    receiving updated parameter values as the one or more brake components are increasing brake force; and,
    if an updated parameter value remains above the predetermined parameter threshold value as the one or more brake components are increasing brake force, placing one or more brake components on a steering axle in a locked state.

14. The method according to claim 12, wherein the at least one parameter is vehicle yaw and the predetermined threshold value is a predetermined parameter yaw threshold value.

15. The method according to claim 12, wherein the predetermined parameter threshold is exceeded when a steering system fault condition exists.

16. The method according to claim 12, wherein the at least one parameter is lateral acceleration, and wherein the predetermined parameter threshold value is a predetermined lateral acceleration threshold value.

17. The method according to claim 16, wherein the predetermined lateral acceleration threshold value is approximately 0.3G.

18. The method according to claim 12, wherein the at least one parameter is a condition of a brake modulator valve, and wherein the predetermined parameter threshold is exceeded when a brake modulator valve fault condition exists.

19. The method according to claim 12, wherein the one or more brake components are on a steering axle of the vehicle.

20. The method according to claim 12, further comprising determining that the at least one affected wheel end is on a steering axle, and braking an opposite steering axle wheel end first, followed by braking a drive axle.

21. The method according to claim 12, further comprising determining that the at least one affected wheel end is on a first side of a drive axle, and braking one of an opposite wheel end on the drive axle or an opposite wheel end on a steering axle.

22. A processor that facilitates maintaining lateral control of a vehicle, the processor being configured to:
monitor at least one parameter of the vehicle having a plurality of wheel ends each comprising a brake component;
receive information related to a current parameter value for a monitored vehicle parameter;
receive from a steering wheel sensor information indicative of a failed modulator valve;
compare the current parameter value to a predetermined parameter threshold value;
determine that the current parameter value exceeds the predetermined parameter threshold value;
identify at least one wheel end that is affected by the failed modulator valve; and
transmit a control signal that causes one or more brake components not associated with the at least one affected wheel end to begin increasing braking force only at one or more respective unaffected wheel ends to maintain stability.

23. The processor according to claim 22, wherein the processor is further configured to:
receive updated parameter values as the one or more brake components are increasing braking force; and,
if an updated parameter value remains above the predetermined parameter value as the one or more brake components are increasing braking force, place one or more brake components associated with one or more wheel ends on a steering axel in the locked state.

24. The processor according to claim 22, wherein the at least one parameter is vehicle yaw and the predetermined threshold value is a predetermined parameter yaw threshold value.

25. The processor according to claim 22, wherein the predetermined parameter threshold is exceeded when a steering system fault condition exists.

26. The processor according to claim 22, wherein the at least one parameter is lateral acceleration, and wherein the predetermined parameter threshold value is a predetermined lateral acceleration threshold value.

27. The processor according to claim 26, wherein the predetermined lateral acceleration threshold value is approximately 0.3G.

28. The processor according to claim 22, wherein the at least one parameter is a condition of a brake modulator valve, and wherein the predetermined parameter threshold is exceeded when a brake modulator valve fault condition exists.

29. The processor according to claim 22, wherein the one or more brake components are on a steering axle of the vehicle.

30. An apparatus for maintaining lateral control of a vehicle, comprising:
monitoring means for monitoring at least one parameter of the vehicle having a plurality of wheel ends each comprising a brake component;
receiving means for receiving information related to a current parameter value for a monitored vehicle parameter;
receiving means for receiving from a steering wheel sensor information indicative of a failed modulator valve;
comparing means for comparing the current parameter value to a predetermined parameter threshold value;
determining means for determining that the current parameter value exceeds the predetermined parameter threshold value;
identifying means for identifying at least one wheel end that is affected by the failed modulator valve; and
transmitting means for transmitting a control signal that causes one or more brake components not associated with the at least one affected wheel end to begin increasing braking force only at one or more unaffected wheel ends to maintain stability.

* * * * *